United States Patent
Lane et al.

(10) Patent No.: US 9,558,748 B2
(45) Date of Patent: Jan. 31, 2017

(54) METHODS FOR HYBRID GPU/CPU DATA PROCESSING

(71) Applicant: CARNEGIE MELLON UNIVERSITY, a Pennsylvania Non-Profit Corporation, Pittsburgh, PA (US)

(72) Inventors: Ian Lane, Sunnyvale, CA (US); Jike Chong, Sunnyvale, CA (US); Jungsuk Kim, Sunnyvale, CA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 14/426,735

(22) PCT Filed: Sep. 9, 2013

(86) PCT No.: PCT/US2013/058829
§ 371 (c)(1),
(2) Date: Mar. 7, 2015

(87) PCT Pub. No.: WO2014/040003
PCT Pub. Date: Mar. 13, 2014

(65) Prior Publication Data
US 2015/0243285 A1 Aug. 27, 2015

Related U.S. Application Data

(60) Provisional application No. 61/743,607, filed on Sep. 7, 2012.

(51) Int. Cl.
*G10L 15/18* (2013.01)
*G10L 15/34* (2013.01)
(Continued)

(52) U.S. Cl.
CPC ............... *G10L 15/34* (2013.01); *G06F 3/167* (2013.01); *G10L 15/22* (2013.01); *G10L 2015/081* (2013.01); *G10L 2015/223* (2013.01)

(58) Field of Classification Search
USPC .................................................. 704/231–257
See application file for complete search history.

(56) References Cited

U.S. PATENT DOCUMENTS 5,388,183 A * 2/1995 Lynch ................... G10L 15/083
704/236
5,768,603 A * 6/1998 Brown ................ G06F 17/2755
704/232

(Continued)

FOREIGN PATENT DOCUMENTS

EP 233767 A3 6/2011

OTHER PUBLICATIONS

Owens et al.; GPU Computing, Graphics Processing Units-powerful, programmable, and highly parallel -are increasingly targeting general-purpose computing applications; Proceedings of the IEEE; vol. 96, No. 5, May 2008; pp. 879-899.*

(Continued)

*Primary Examiner* — Abul Azad
(74) *Attorney, Agent, or Firm* — David G. Oberdick; Michael G. Monyok

(57) ABSTRACT

The present invention describes methods for performing large-scale graph traversal calculations on parallel processor platforms. The invention describes methods for on-the-fly hypothesis rescoring that utilizes graphic processing units (GPUs) in combination with utilizing central processing units (CPUs) of computing devices. The invention is described in one embodiment as applied to the task of large vocabulary continuous speech recognition.

14 Claims, 14 Drawing Sheets

(51) Int. Cl.
*G06F 3/16* (2006.01)
*G10L 15/22* (2006.01)
*G10L 15/08* (2006.01)

(56) References Cited

U.S. PATENT DOCUMENTS

| | | | |
|---|---|---|---|
| 6,249,761 B1* | 6/2001 | Phillips | G10L 15/34 704/231 |
| 8,484,154 B2* | 7/2013 | You | G10L 15/34 706/52 |
| 9,240,184 B1* | 1/2016 | Lin | G10L 15/22 |
| 2005/0149326 A1* | 7/2005 | Hogengout | G10L 15/08 704/242 |
| 2007/0143112 A1* | 6/2007 | Yu | G10L 15/08 704/257 |
| 2007/0198266 A1* | 8/2007 | Li | G10L 15/08 704/255 |
| 2007/0273699 A1 | 11/2007 | Sasaki et al. | |
| 2008/0100629 A1 | 5/2008 | Bakalash et al. | |
| 2011/0022385 A1* | 1/2011 | Kato | G10L 15/08 704/231 |
| 2011/0066578 A1 | 3/2011 | Chong et al. | |
| 2011/0202745 A1 | 8/2011 | Bordawekar et al. | |
| 2012/0023110 A1* | 1/2012 | Zidan | G06F 19/22 707/748 |
| 2012/0149464 A1 | 6/2012 | Bone et al. | |

OTHER PUBLICATIONS

International Search Report and Written Opinion of the International Searching Authority for PCT Application PCT/US2013/058829 dated Dec. 6, 2013.

Chong, Jike, et al. "A fully data parallel WFST-based large vocabulary continuous speech recognition on a graphics processing unit." In INTERSPEECH, pp. 1183-1186, 2009.

European Search Report for European Application 13834877.6 dated Apr. 5, 2016.

Ney, H. et al. "Dynamic programming search for continuous speech recognition." IEEE Signal Processing Magazine 16, No. 5 (1999): 64-83.

Chong, J. et al. "Exploring recognition network representations for efficient speech inference on highly parallel platforms." In INTERSPEECH, pp. 1489-1492. 2010.

Hori, T. et al. "Efficient WFST-based one-pass decoding with on-the-fly hypothesis rescoring in extremely large vocabulary continuous speech recognition." IEEE Transactions on audio, speech, and language processing 15, No. 4 (2007): 1352-1365.

You, K. et al. "Parallel scalability in speech recognition." IEEE Signal Processing Magazine 26, No. 6 (2009): 124-135.

* cited by examiner

| current token | token history (n-1, n-2) | probability of occurrence |
|---|---|---|
| beach | a, wreck, <s> | 0.00002 |
| beach | nice, a, <s> | 0.00010 |
| beach | a, recognize, <s> | 0.00001 |
| speech | a, wreck, <s> | 0.00001 |
| speech | nice, a, <s> | 0.00010 |
| </s> | speech, recognize | 0.00040 |

FIG. 6

| token | probability of occurrence | token | probability of occurrence |
|---|---|---|---|
| <s> | 0.100 | nice | 0.100 |
| </s> | 0.100 | recognize | 0.200 |
| a | 0.200 | speech | 0.100 |
| beach | 0.100 | wreck | 0.100 |

FIG. 7

| partial hypothesis | token sequence probability | |
|---|---|---|
| | before rescoring | after rescoring |
| "wreck a beach ... | 0.0002 | 0.00002 |
| "a nice beach ... | 0.0002 | 0.00010 |
| "recognize a beach ... | 0.0004 | 0.00001 |
| "wreck a speech ... | 0.0002 | 0.00001 |
| "a nice speech ... | 0.0002 | 0.00010 |
| "recognize speech" | 0.0002 | 0.00040 |

FIG. 8

| | Description | Number of bits |
|---|---|---|
| 42 | score for partial hypothesis | 20-bits |
| 43 | incoming partial hypothesis ID | 4-bits |
| 44 | incoming arcID | 32 bits |
| 45 | token history ID | 8 bits |

Most Significant bit
↓
Least Significant bit

METHODS FOR HYBRID GPU/CPU DATA PROCESSING

CROSS-REFERENCE TO RELATED APPLICATIONS

This application is a national application under 35 U.S.C. §371 of PCT International Application No. PCT/US2013/058829 titled METHODS FOR HYBRID GPU/CPU DATA PROCESSING and filed on Sep. 9, 2013, which claims the benefit of U.S. Provisional Application Ser. No. 61/743,607, titled METHODS FOR HYBRID GPU/CPU DATA PROCESSING and filed on Sep. 7, 2012, both of which are incorporated by reference herein.

FIELD OF THE INVENTION

This invention relates to the field of data processing. More particularly, this invention relates to methods to perform large-scale graph traversal on parallel processor platforms.

BACKGROUND OF THE INVENTION

In recent years it has become more common for computers to have multicore and manycore processes, which significantly increases the speed at which complex computing tasks can be performed by performing such tasks in a parallel manner across the various processing cores. For some complex computing tasks however, such processors are limited by their memory capacity. For example, manycore graphic processing units (GPU) have a limit of 2-8 gigabyte (GB) of memory. This memory presents a limit for tasks such calculating a large-scale graph traversal where graph structures consist of many millions of arcs and models can be on the order of 100 s of GB in size or larger.

Therefore there is a need for methods that will effectively perform large-scale graph traversal on parallel processor platforms, by efficiently leveraging heterogeneous parallel computing cores.

One field in which such improved methods are needed is in the field of large vocabulary continuous speech recognition (LVCSR). As one example of such a need, voice user interfaces are rising as a core technology for next generation smart devices. To ensure a captivating user experience it is critical that the speech recognition engines used within these systems are robust, fast, have low latency and provides sufficient coverage over the extremely large vocabularies that the system may encounter. In order to obtain high recognition accuracy, state-of-the-art speech recognition systems for tasks such as broadcast news transcription[1, 2] or voice search [3, 4] may perform recognition with large vocabularies (>1 million words), large acoustic models (millions of model parameters), and extremely large language models (billions of n-gram entries). While these models can be applied in offline speech recognition tasks, they are impractical for real-time speech recognition due to the large computational cost required during decoding.

The use of statically compiled Weighted Finite State Transducer (WFST) networks, where WFSTs representing the Hidden Markov Model (HMM) acoustic model H, context model C, pronunciation lexicon L, and language model G composed as one single network, commonly known as an H-level WFST, makes it possible to perform speech recognition very efficiently [5]. However, the composition and optimization of such search networks becomes infeasible when large models are used.

On-the-fly composition is a practical alternative to performing speech recognition with a single fully composed WFST. On-the-fly composition involves applying groups of two or more sub-WFSTs in sequence, composing them as required during decoding. One common approach is to precompose HoCoL before decoding and then compose this with the grammar network G on-the-fly. On-the fly composition has been shown to be economical in terms of memory, but decoding is significantly slower than a statically compiled WFST [6].

An alternative approach for efficient WFST decoding is to perform hypothesis rescoring [3] rather than composition during search. In this approach Viterbi search is performed using $HoCoG_{uni}$, and another WFST network $G_{uni/tri}$ is used solely for rescoring hypotheses generated from the Viterbi search process in an on-the-fly fashion. Since this algorithm allows all knowledge sources to be available from the beginning of the search this is effective for both selecting correct paths and pruning hypotheses.

With manycore graphic processing units (GPU) now a commodity resource, hybrid GPU/CPU computational architectures are a practical solution for many computing tasks. By leveraging the most appropriate architecture for each computational sub-task, significantly higher throughput can be achieved than by using either platform alone. Prior works [7, 8] have demonstrated the efficiency of using GPU processors for speech recognition and obtained significant improvements in throughput for limited vocabulary tasks [7]. The limited memory on these architectures, however, becomes a significant bottleneck when large acoustic and language models are applied during recognition, and also for other large-scale graph traversal computations. The most significant challenge for such computations is handling the extremely large language models used in modern broad-domain speech recognition systems [1, 2, 4]. These models can contain millions of unique vocabulary entries, billions of n-gram contexts, and can easily require 20 GB or more to store in memory. Even when significantly pruned these models cannot fit within the limited memory available on GPU platforms. To efficiently perform speech recognition with large acoustic and language models we have developed a hybrid GPU/CPU architecture which leverages large memory and local-cache of the CPU with the computational throughput of GPU architectures.

BRIEF SUMMARY OF THE INVENTION

The present invention describes methods for performing large-scale graph traversal calculations on parallel processor platforms. The invention describes methods for on-the-fly hypothesis rescoring that utilizes graphic processing units (GPUs) in combination with utilizing central processing units (CPUs) of computing devices. The invention is described in one embodiment as applied to the task of large vocabulary continuous speech recognition. Those skilled in the art will recognize that the methods of the present invention are applicable to other large-scale graph traversal computations.

BRIEF DESCRIPTION OF THE FIGURES

FIG. 6 shows an example language model, with language model probabilities listed for a current word, given a known word history;

FIG. 7 shows an example of small language model, appropriate for use during composition when compiling a WFST-based search graph for use on a Graphic-Processing-Unit (GPU). This language model was sub-selected from the larger language model in FIG. 6 using a language model threshold ($T_{LM}$) of 0.05 with language model probabilities;

FIG. 8 shows an example of partial hypothesis re-scoring for the task of automatic speech recognition using the large and small language models shown in FIG. 6 and FIG. 7 respectively. Before rescoring, the phrase "recognize a beach . . . " has the highest probability, however after rescoring with the large language model, the partial hypothesis with the highest probability is "recognize speech"

DETAILED DESCRIPTION OF THE INVENTION

The present invention describes methods for performing large-scale graph traversal calculations on parallel processor platforms. The invention describes methods for "on-the-fly hypothesis rescoring" that utilizes graphic processing units (GPUs) in combination with utilizing one or more central processing units (CPUs) of computing devices. The invention is described in one embodiment as applied to the task of large vocabulary continuous speech recognition (LVCSR). Those skilled in the art will recognize that the methods of the present invention are applicable to other statistical inference tasks in which large-scale graph traversal computation is required; examples include hand-writing recognition, image-based gesture recognition, and image understanding.

Figure 1:
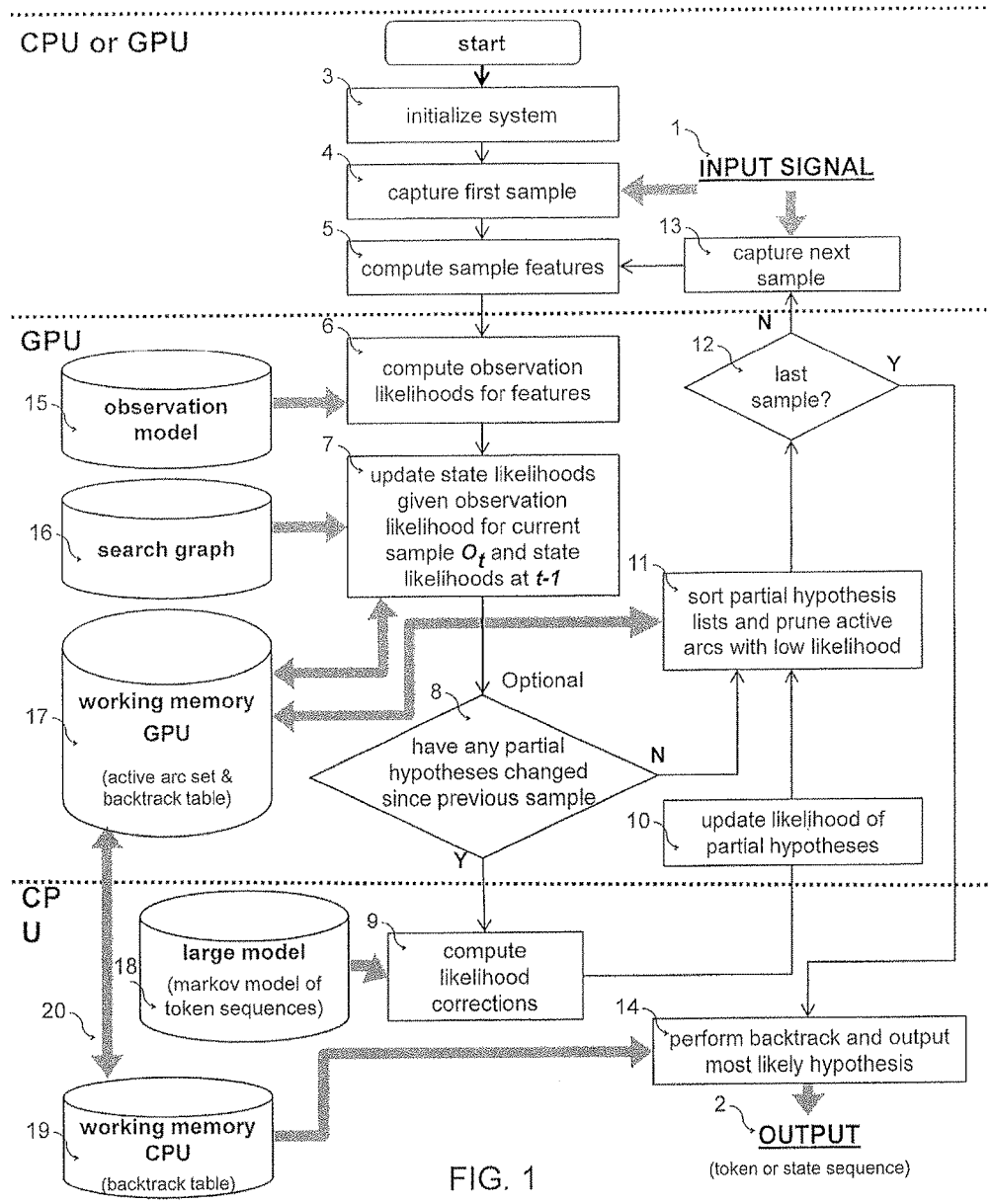
FIG. 1 shows a schematic drawing of the implementation structure of the present invention as applied to the task of large-scale graph traversal.

In this invention, we describe a novel on-the-fly hypotheses rescoring algorithm for Hybrid GPU/CPU architectures. An overview of the approach of the present invention is shown in FIG. 1.

Given an input signal (item 1) and a set of statistical models (items 15, 16 and 18), search is performed to find the best token-sequence (item 2) jointly through the models that most closely matches the input signal.

Figure 5:
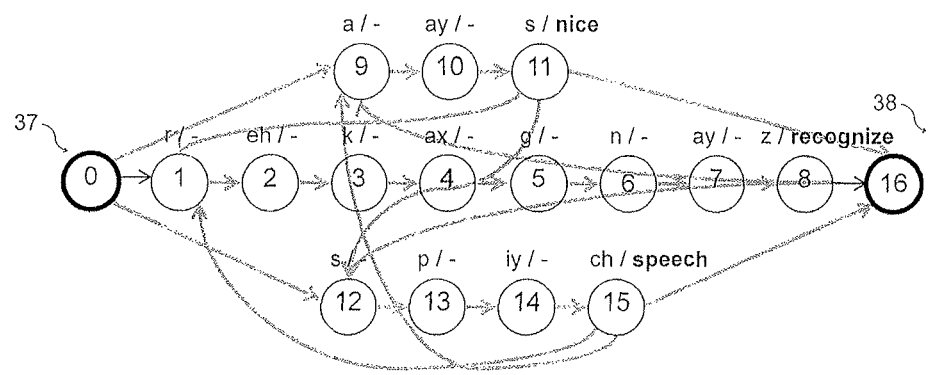
FIG. 5 shows an example of small WFST search graph, appropriate for search on a Graphic-Processing-Unit (GPU). The example shows a search graph as applied in speech recognition for a very simple task consisting of three words ("nice", "recognize", and "speech") occurring in any order.

In one embodiment of this invention, namely for the task of Large Vocabulary Speech Recognition (LVCSR), the input signal (item 1) could be digital audio captured from a microphone and the output (item 2) the word sequence most closely matching what the user uttered. For the Large Vocabulary Speech Recognition (LVCSR) task, item 15 would map to an Acoustic Model (for example a Gaussian Mixture Model or Deep Neural Network-based Stochastic Model), item 16 would be a fully composed H-level Weighted Finite State Transducer (WFST)-based search graph (a demonstrative example of such a graph is shown in FIG. 5), and item 18 would be a Language Model (for example, language model probabilities stored in a static Lookup Table or alternatively a Deep Neural Network-based Statistical Model).

In the presented invention, search is performed in the following manner. On initialization (FIG. 1, step 3), any temporary working memory (items 17 and 19) is cleared, and state likelihoods are initialized for the search network. Specifically, the likelihood for the initial state in the network (state 0) is set to 1.0 and the likelihood for all other states are set to 0. As a demonstrative example, item 37 identifies the initial state of the search graph in FIG. 5.

When the INPUT SIGNAL is first received a sample is captured (step 4) and a set of representative features are computed or extracted from the sample (step 5). The resulting "feature vector" is a low dimension representation of the most informative aspects of the captured signal. One or more feature vectors could be computed per sample depending on the application task.

In one embodiment of this invention, namely LVCSR, the input signal (item 1) is digital audio. For this task, an audio sample of 25 mS could be captured (steps 4 and 13) every 10 mS allowing overlap of the input signal. Acoustic features could then computed for each 25 mS sample of Audio. Standard acoustic features that could be used for this task include log-Mel filterband energy and Mel-Frequency-Cepstral-Coefficient (MFCC) features. A similar approach can also be used when an image or audio-visual signal is the input signal. Sample Capture (steps 4 and 13) and Feature Computation (step 5) can be performed on any compute device, using either CPU or GPU compute architectures. They do not necessarily need to be performed on the same compute device as the other steps in this invention.

Once a feature vector has been generated (step 5), an N-best search is then performed on the GPU (steps 6, 7, 8, 11 and 12), leveraging the CPU to compute incorporate model likelihood corrections (steps 9 and 10), using a large token sequence model stored in CPU main memory (item 18). During search, first observation likelihoods are computed (step 6) for each new feature vector using a statistical observation model (item 15), for example a Gaussian Mixture Model or Deep Neural Network-based Model. In step 7, state-likelihoods, using equation (1), based on the observation likelihood computed in step 6, and the state-likelihoods in the previous time step. The state likelihood $\alpha[g']$ of a new partial hypothesis g' is calculated as:

$$\alpha[g']=\alpha[g]+\beta[e]+\omega[e]. \quad (1)$$

where $\beta[e]$ is the observation likelihood of the input symbol i[e] (computed using item 15), $\omega[e]$ is the state transition probability (from item 16), and $\alpha[g]$ is the state likelihood from the previous time-synchronous (step 6)

In the presented invention, a model likelihood correction, c[e, h[g]], is introduced, to enable a significantly larger model to be applied on-the-fly:

$$\alpha[g']=\alpha[g]+\beta[e]+\omega[e]+c[e,h[g]] \quad (2)$$

The model likelihood correction factor, c[e, h[g]], is the difference between the model likelihoods of a smaller model $P_{uni}(o[e])$ (i.e. a language model which was applied during WFST composition) and a much larger model, $P_{ngm}(o[e]|h[g])$ (item 18) which is applied during search:

$$c[e,h[g]]=\log(P_{uni}(o[e]))-\log(P_{ngm}(o[e]|h[g])). \quad (3)$$

where h[g] is the output symbol sequence of the hypothesis g

During the search process, if the output symbol sequence of any partial hypothesis g (h[g]) changes (step 8) rescoring is then performed for that hypothesis. In the rescoring stage, first, the model likelihood correction factor, c[e, h[g]] (equation 3) is computed (step 9). Here, a large model (item 18), stored in CPU memory is used to compute $P_{ngm}(o[e]|h[g])$. Next, the state likelihood $\alpha[g']$ of the partial hypothesis is updated using the model likelihood correction factor, as described in equation 2 (step 10).

After rescoring is performed, partial hypotheses are ranked based on their state likelihoods $\alpha[g']$ and those that fall below a ranking threshold are removed from consideration (step 11).

This search process (steps 6, 7, 8, 9, 10, 11, 12, 13) is iterated until the last sample is encountered (step 12). At which point back-track is performed on the CPU (step 14) generating the final 1-best hypothesis output (item 2). A back-track table (a table storing the list of active partial hypotheses, and back-pointers to earlier frames in which the partial hypothesis changed) is shared in working memory between the GPU (item 17) and CPU (item 19). To keep this table synchronized, the CPU copies across back-track information from the GPU to the CPU (item 20) after each sample has been processed.

In one embodiment, rather than waiting for the last sample to be encountered before performing back-track (step 12), back-track is performed on the CPU (step 14) every 20 samples, or at a point where the single-best output will not change in the future.

Figure 9:
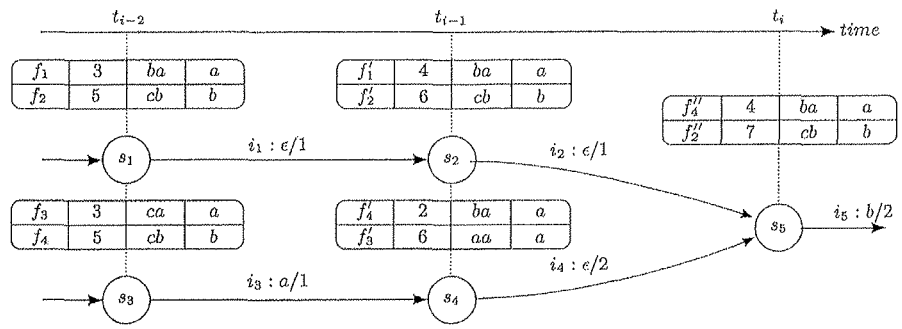
FIG. 9 shows a schematic drawing of the presented invention, demonstrating hypothesis combination and hypothesis pruning.

In the presented invention, n-best Viterbi search is conducted by assigning an n-best hypotheses list to each arc and state. When multiple arcs meet at the same state, n-best hypotheses lists are merged and the Viterbi search chooses n minimally weighted hypotheses across all n-best hypotheses lists. In FIG. 9, f4 from state s2 and f2 from state s3 are maintained in sorted order based on their total weight. In addition, if hypotheses have same higher order history, only less weighted hypothesis will be maintained. For example, f"1 is pruned because this hypothesis has same higher order history "ba" but higher weight compared with f'4 when these are meet in s5. Keeping the n-best list is important to achieve comparable accuracy [7]. If we choose the best hypothesis as explained in 2.1, the partial hypothesis of the final best hypothesis can be pruned out before it reach to an transition e with a non-epsilon output where a hypothesis can be rescored. This scenario is illustrated in FIG. 9 where the hypothesis f1 is the original best path using the standard decoding approach and f4 is the rescored best path. If we only keep the best hypothesis, the overall best hypothesis f4 cannot be reached to the arc between s3 and s4 where the rescoring can be applied. The maximum size of the n-best list should be decided carefully based on the size of the vocabulary and the order of the language model. In given size of the vocabulary, WFST composed with lower order language model requires more n compared with that composed with higher order language model to achieve comparable accuracy due to severe convergence of the arc into the same destination state. Similarly, WFST has more vocabulary requires larger n-best list to keep final best until it reaches to the rescoring point.

The present invention has been described in accordance with several exemplary embodiments, which are intended to be illustrative in all aspects rather than restrictive. In particular, the invention has been described in one embodiment as applied to large vocabulary continuous speech recognition computations. Those skilled in the art will recognize that the invention is applicable to 5 other types of large-scale graph traversal computations. Thus, the present invention is capable of many variations in detailed implementation, which may be derived from the description contained herein by a person of ordinary skill in the art. All such variations and other variations are considered to be within the scope and spirit of the present invention.

Demonstration Example

To demonstrate the effectiveness of the proposed "on-the-fly" rescoring method, we present a set of example models for the task of speech recognition in FIGS. 6, 7 and 8.

First, in order to prepare the search graph (FIG. 1, item 16) we have to sub-select entries from our large language model (FIG. 7) to use during model compilation. In this demonstration example, we sub-selected those model entries where the probability is greater that 0.05. This resulted in the small language model shown in FIG. 6. The resulting search graph would be of similar structure to that shown in FIG. 5.

Figure 2:
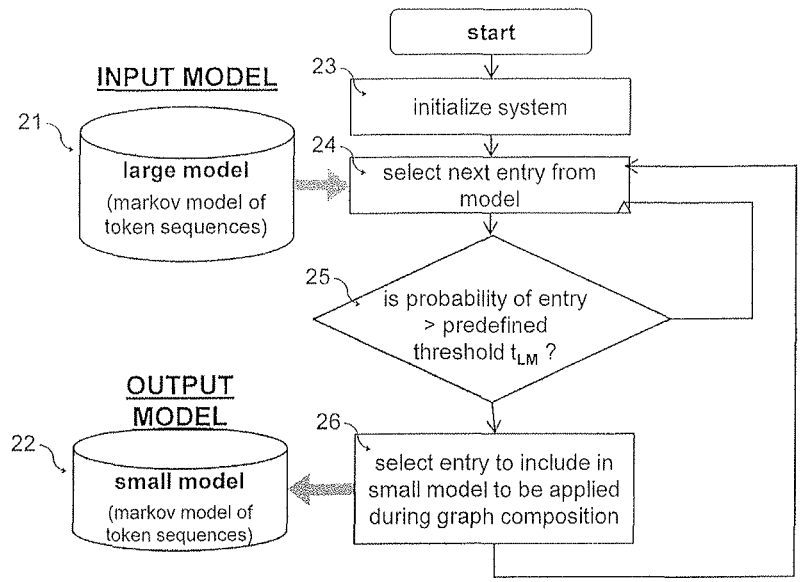
FIG. 2 shows a schematic drawing of the implemented approach to sub-select entries (i.e. probabilities from a Markov model of token sequences) from a large model to include in a small model that will be applied during Weighted-Finite-State-Transducer (WFST) composition. The resulting fully composed WFST search graph will be small enough to perform search on a Graphic-Processing-Unit (GPU)
Figure 3:
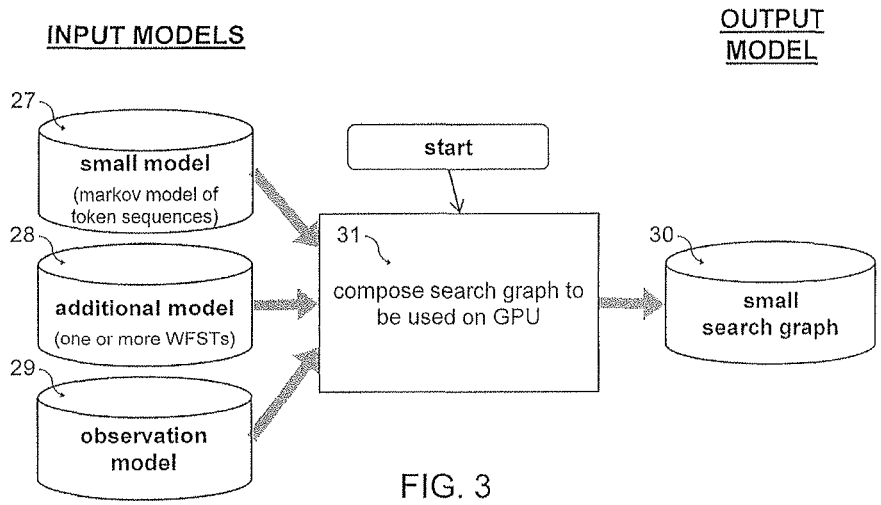
FIG. 3 shows a schematic drawing of the implemented approach used to compose a small WFST search graph appropriate for performing search on a Graphic-Processing-Unit (GPU)
Figure 4:
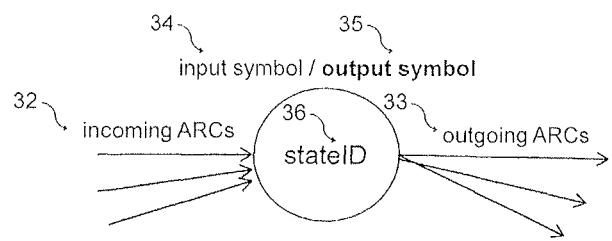
FIG. 4 shows a schematic drawing of information contained within a state and neighboring arcs in a WFST search graph. These include stateID, list of incoming arcs, list of out-going arcs, and input and output symbols. Each arcs contains a arc-specific weight. Input symbols match to probabilities generated by an "observation model". Output symbols match to tokens generated by search the process. For example, for the speech recognition task these tokens would map to words.

The methods to select the optimal model entries from a large model to generate a small model and the search are shown in FIG. 2 and FIG. 3 respectively.

FIG. 8, shows the probability related to six partial-hypotheses, both before and after rescoring using the language models listed in FIGS. 6 and 7. FIG. 8 shows that "recognize a beach . . . , has the highest probability before rescoring. However, after rescoring, the more reasonable the hypothesis "recognize speech" has the highest probability. Although the probability of the word sequence ("<s> recognize speech </s>") is relatively high in the original model, these entries had to be discarded in order to generate a small language model and search graph in order to perform search on the GPU.

Experimental Evaluation

We evaluated effectiveness of our presented invention on for the task of Large Vocabulary Continuous Speech Recognition (LVCSR) using a large vocabulary version of the WSJ task. We used a combined evaluation set consisting of the November 1992 ARPA WSJ 5 k evaluation set (330 sentences) and the November 1993 ARAP WSJ 20 k evaluation set (213 sentences, open vocabulary).

Our acoustic model was trained using the Kaldi toolkit [22] on the WSJ data set with 39 dimensional MFCCs feats with a LDA transformation. The resulting acoustic model contained 240K Gaussians and 2,946 phonetic states.

TABLE 1

Size of WFSTs for various language models.

| Vocab. | n-gram | # of n-gram | WFST (MB) | LM binary (MB) |
|---|---|---|---|---|
| 5K | 1 | 5.0K | 2 | 1 |
|  | 2 | 840.0K | 96 | 13 |
|  | 3 | 4.3M | 684 | 76 |
| 1M | 1 | 1.0M | 91 | 1 |
|  | 2(pruned) | 15.1M | 2,342 | 357 |
|  | 3(pruned) | 10.1M | 3,583 | 407 |
|  | 4 | 769.9M | — | 14,407 |

WFSTs were composed and optimized offline for efficient parallel time-synchronous graph traversal for GPU-accelerated platform as described in [5, 6]. Table. 1 shows the size of the final fully-composed WFSTs for 5 k and 1000 k vocabulary language models. We evaluate the proposed algorithm using a single GPU in a 4-way NVIDIA Tesla K20 GPU server with two Intel Xeon E5-2640 6-core CPUs. The NVIDIA Tesla K20 GPU contains 13 Streaming Multiprocessors (SMX) with 2,496 CUDA cores and 5 GB GDDR5 memory. The operating system was Ubuntu 12.04 LTS (64 bits) and the decoder was compiled with g++4.6 and nvcc5.0 [23]. In the following section we compare the following composition schemes: Standard approach using WFST composed with 3-gram language model (STD-3), the lattice generation rescored 2-gram/3-gram language model combination (LATR-2.3) using a lattice beam as lbw2.3, and proposed on-the-fly rescored 2-gram/3-gram combination (OTFR-2.3) conducting n2.3-best search with m2.3 threads.

Accuracy Performance:

In the first evaluation, we attempted to validate the accuracy of the proposed rescoring approach (OTFR) using a small vocabulary 5K test set. We generated 3 fully composed WFST using the same knowledge sources but different language models. For the 1-gram and 2-gram case, we applied our proposed on-the-fly hypothesis rescoring approach. Decoding with N1, N2 and rescored on-the-fly using a 3-gram language model obtained similar Word Error Rate (WER) to the STD-3 case and LATR-2.3 when n1.3, n2.3 were 9, 3 respectively. n1.3 is larger than n2.3 to achieve comparable WER, 5.4% compared with n2.3 as explained in 3. Similarly, LATR-2.3 requires wider lbw2.3 to achieve the comparable accuracy for the given global beam width across all decoding approaches. In the large vocabulary (1M vocabulary) evaluation, OTFR-2.4 showed 0.3% absolute accuracy degradation compared with OTFR-3.4 case when the n2.4, n3.4 was 3. This reveals lower order language model as well as larger vocabulary requires more n to achieve comparable accuracy with standard and lattice rescoring algorithms.

Figure 10:
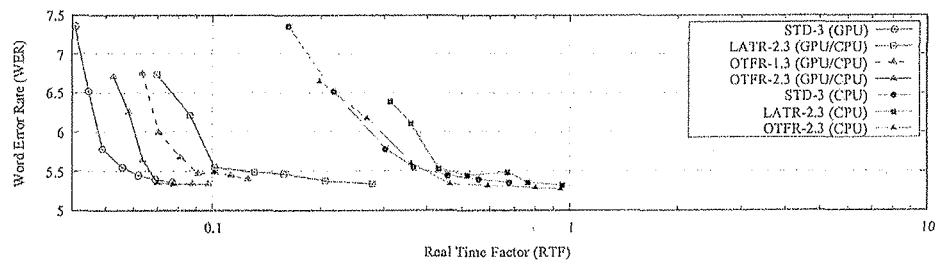
FIG. 10 shows data comparing the accuracy and decoding speed using the prior art approach and that of the present invention as applied to the task of large vocabulary continuous speech recognition with a vocabulary size of 5000 words. Eval. set: WSJ 5K nov'92 (330 sentences)), $n_{1,3}=9$, $m_{1,3}=1$, $n_{2,3}=3$, $m_{2,3}=4$, $lbw_{2,3}=7$).
Figure 11:
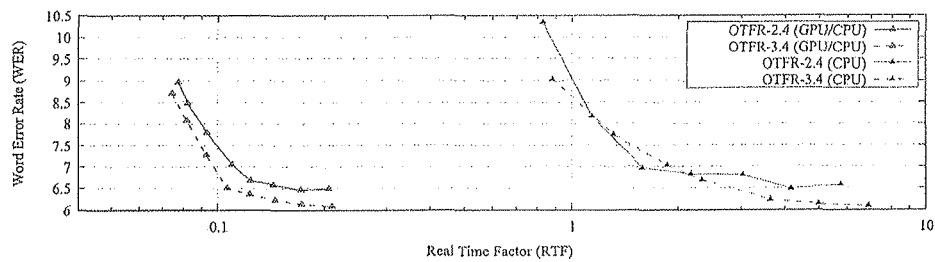
FIG. 11 shows data comparing the accuracy and decoding speed using the prior art approach and that of the present invention as applied to the task of large vocabulary continuous speech recognition with a vocabulary size of 1 Million. 1M vocabulary evaluation results (Eval. set: WSJ 5K nov'92+WSJ 20 k nov'93 (543 sentences), $n_{2,3}=n_{3,4}=3$, $m_{2,3}=m_{3,4}=24$)
Figure 12:
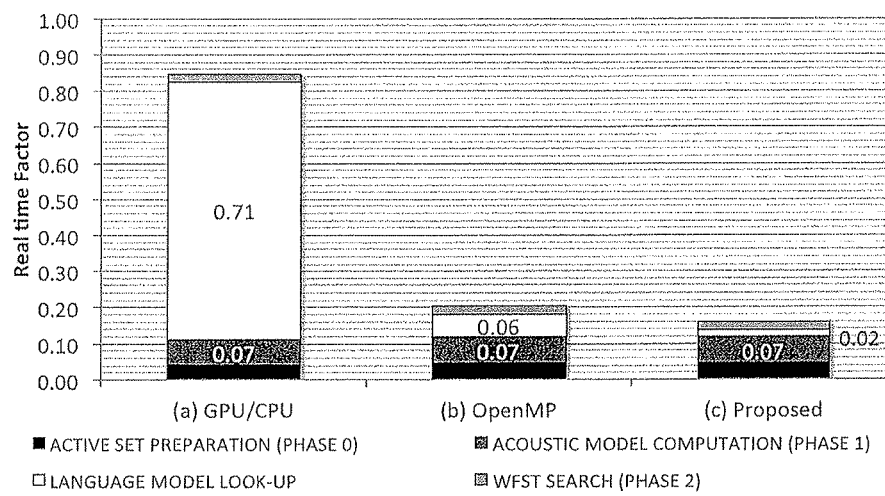
FIG. 12 shows data on the ratio of processing time per computational phase in experiments using the present invention as applied to the task of large vocabulary continuous speech recognition. (1M vocabulary, $n_{3,4}=3$, $m_{3,4}=24$)
Figures 13, 14:
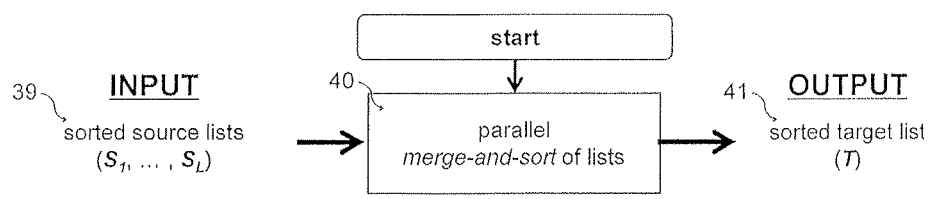
FIG. 13 shows the input and output for the "parallel atomic merge-and-sort" method as used in the present invention. The input consists of L sorted lists ($S_1, \ldots, S_L$), and the output is a single sorted list (T)
FIG. 14 shows the data-structure used to store partial hypothesis information in the "atomic merge-and-sort" method as used in the present invention.
Figure 15:
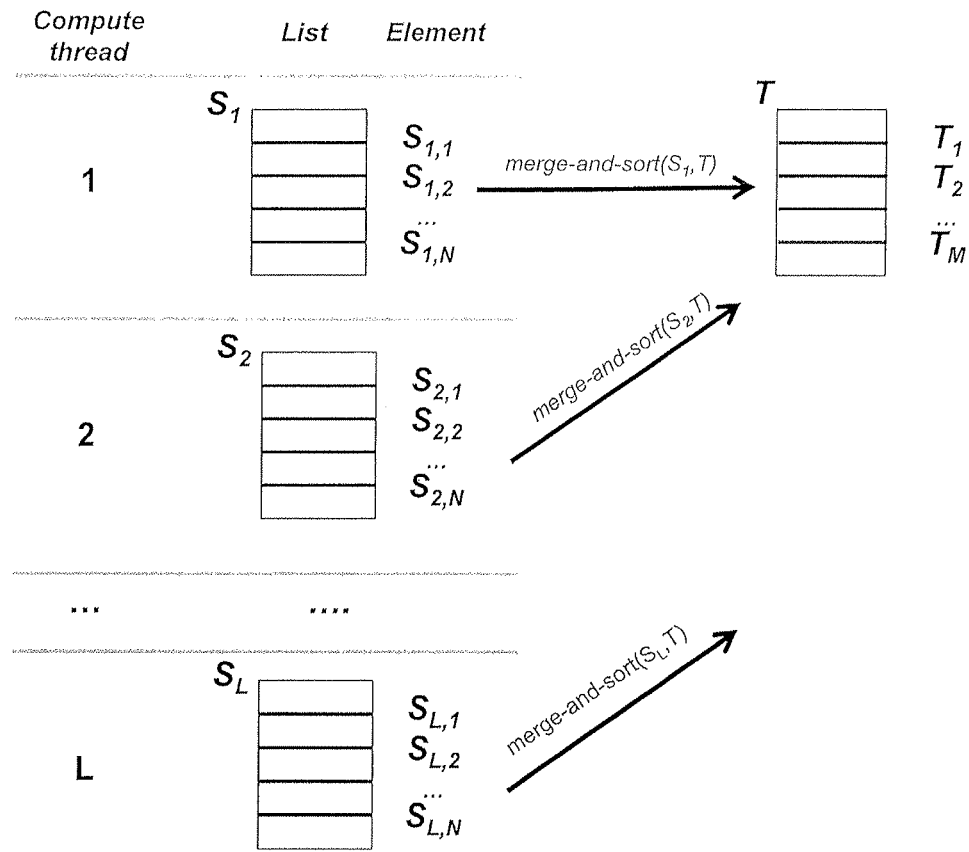
FIG. 15 shown a overview of the data structures and functions used in the "atomic merge-and-sort" method as used in the present invention. The function "merge-and-sort (<source list>, <target list>)" is called for all L sorted lists ($S_1, \ldots, S_L$) that need to be merged.

Speed Performance:

In the second evaluation, we evaluated the decoding speed using both the single core implementation and GPU-accelerated multicore implementation. The baseline implementation is optimized using Automatically Tuned Linear Algebra Software (ATLAS) to accelerate the acoustic weight computation process. The GPU/CPU evaluations in FIG. 10 and FIG. 11, the language model look-up was performed in parallel across multiple CPU cores, concurrently with acoustic model computation on the GPU. A breakdown of these steps is shown in FIG. 12. FIG. 12 shows baseline GPU standard decoding approach without any optimization. The language model look-up consumed majority of the decoding time. By performing language model look-up using OpenMp (b) the time required for look-up is reduced by factor of 11.6× from 0.71 to 0.06 RTF. Finally, by performing language model look-up concurrently with the acoustic weight computation on the GPU the entire decoding time is reduced further from 0.20 RTF to 0.12 RTF. In FIG. 10, OTRF-3.4 showed decoding speed, 10× faster than real-time when the WER is 6.5% using GPU and multi core CPUs efficiently. Compared to highly optimized singly CPU implementation 24× faster. The results show WFST composed with the higher order language model more appropriate in terms of decoding speed. In FIG. 11, OTFR2.3 is 40% relatively faster than OTFR-1.3 when the WER is 5.4%. We also observed this in FIG. 11, OTFR-3.4 is relatively faster than OTFR-2.4.

A Method for Merging Sorted Lists on Highly Parallel Compute Architectures: Atomic Merge-and-Sort Maintaining n-best hypotheses during the Viterbi search has many parallelization challenges. The most important challenge is the merging of n-best lists on reconvergent paths. We chose to maintain a sorted n-best list with the minimally weighted hypothesis on top. This simplifies the process of merging n-best hypotheses lists into a process of "merge-and-sore". On a CPU, this process can be performed quite efficiently.

Figure 16:
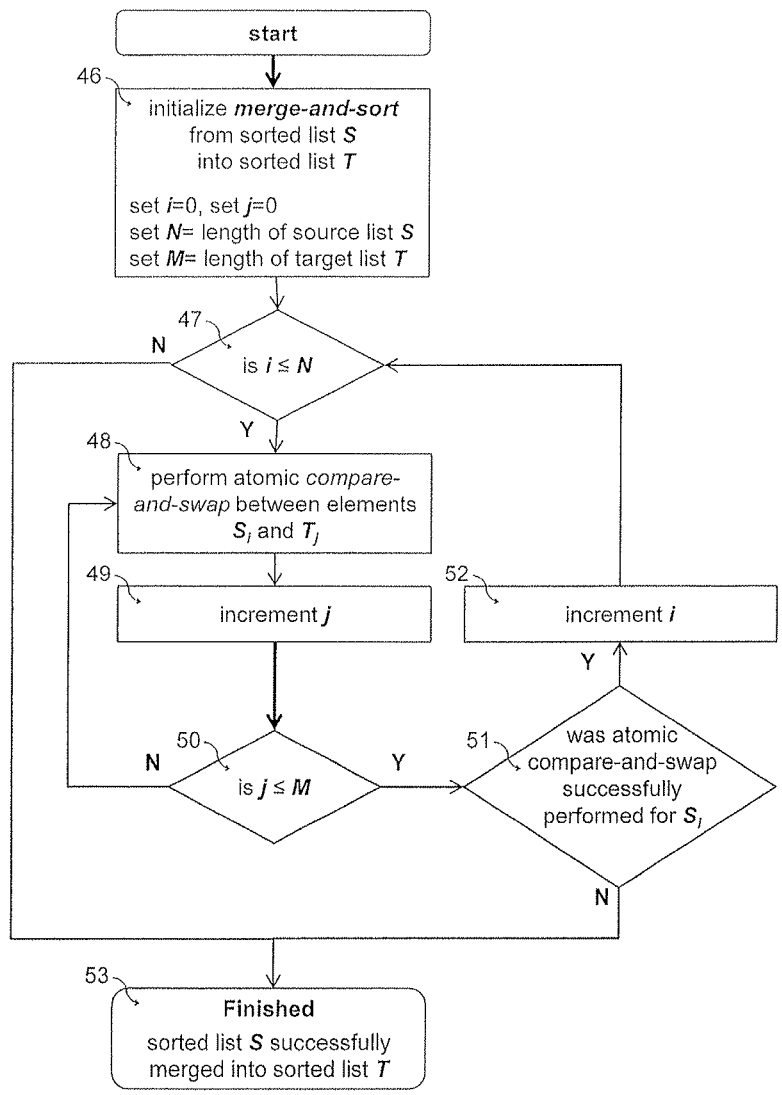
FIG. 16 shows a schematic drawing of the "atomic merge-and-sort" method as used in the present invention.

On a GPU, however, there may be hundreds of arcs, each with an n-best list, trying to write into the n-best list at the destination state at the same time. We developed a new method to merge the n-best list atomically on a highly parallel platform using atomic Compare-And-Swap operations as shown in FIG. 16. The GPU provides hardware supported atomic operations that are efficiently implemented and we leverage this capability to implement an "atomic merge-and-sort" method, on this platform. FIGS. 13, 14, 15 and 16.

An Architecture for Fast and Memory Efficient Look-Up of Markov Model Probabilities The on-the-fly hypothesis rescoring approach, described above, enables large models (typically Markov models, which provide a probability for token sequence) to be introduced into WFST search on the GPU. When a token boundary is encountered during search on the GPU, the partial hypotheses (which consists of a history stateID, WFST weight and current token) are rescored using a larger model stored on the CPU. The efficiency of model look-up (shown in FIG. 1, Step 9 "compute rescoring weights") is critical for fast recognition.

Figure 17:
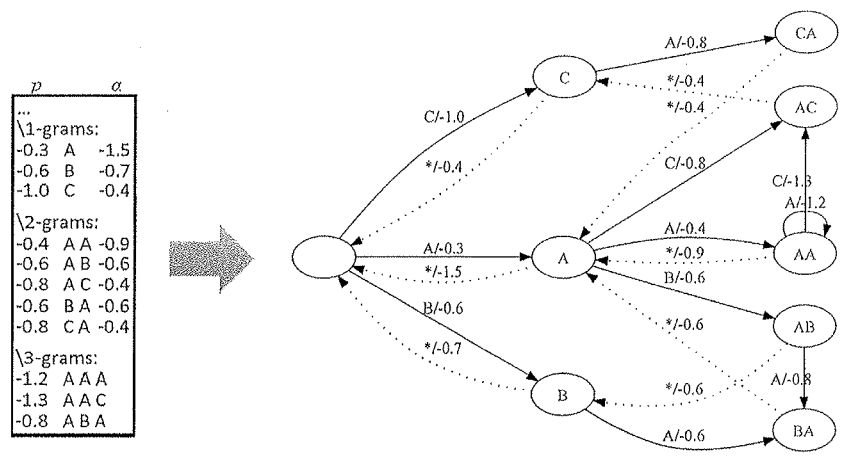
FIG. 17 shows an example of a language model converted to the "Fast and memory efficient look-up" architecture as used in the present invention.

To reduce the time required for this step we developed a novel graph-based model structure optimized for rapid hypothesis rescoring. An overview of this model is shown in FIG. 17. This model represents histories (token sequences) as states within a graph structure. Probabilities of histories are stored as outgoing arcs from these states. Both histories and tokens are represented as integers within this framework, and the token IDs used in directly match those in the fully composed WFST, applied during search on the GPU. During hypothesis rescoring computing the probability for a specific <stateID (h), tokenID (t)> pair involves finding the stateID (which is a direct index lookup in a array), searching the outgoing arcs for the tokenID of interest, and then either returning the probability p(tokenID (t)|stateID (h)) and the updated stateID.

FIG. 17 shows a small Language Model represented in the proposed graph-based structure. Each node represents a unique history (unique token sequence). The solid arcs are labeled with a token and it's probability and lead to a new history. The dotted arcs represent back-off arcs. They are labeled with the back-off weight and they lead to a state with the reduced history.

Figure 18:
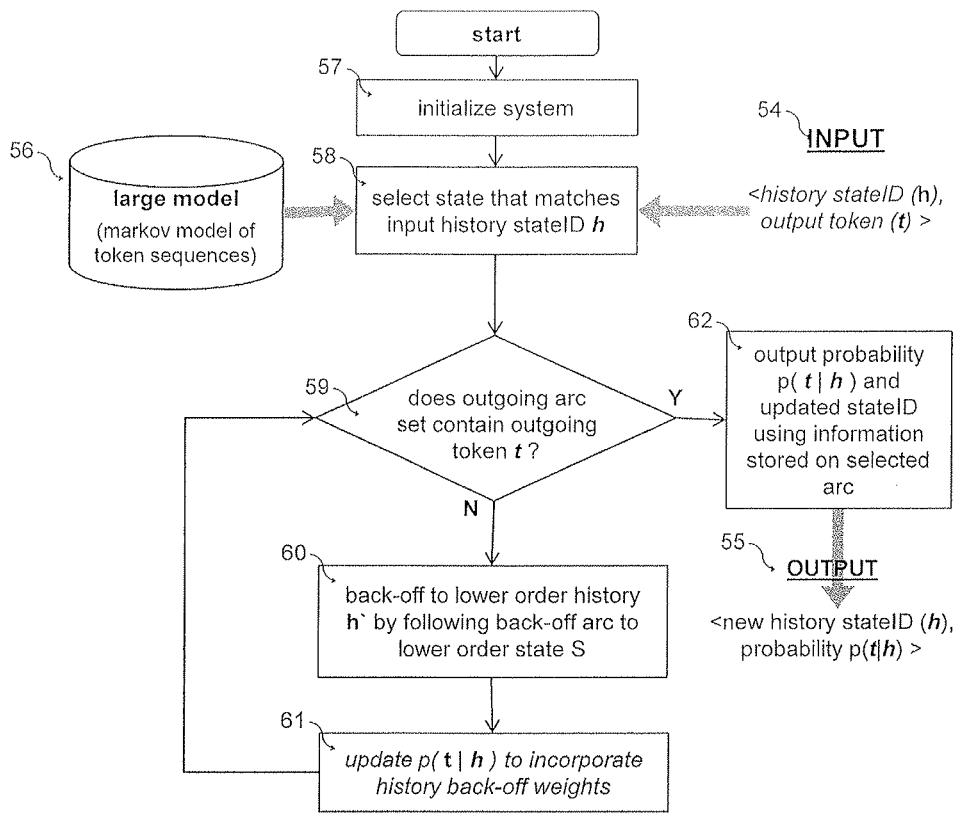
FIG. 18 shows a schematic drawing of the procedure to extract a probability (for a given history and output token) with the "fast and memory efficient look-up" architecture as used in the present invention.

FIG. 18 shows the process required to obtain the probability for a specific <stateID (h), tokenID (t)> pair using this approached To reduce the memory foot-print required for this model we use a novel method where the data structure used to store the out-going sets of arcs changes depending on the number of arcs exiting a state. We implemented a prototype that used four data structures, namely: HASH-MAP (default), STATIC ARRAY, BINARY-SEARCH TREE, or a single INTEGER, however other data structures could also be used for this purpose.

Figure 19:
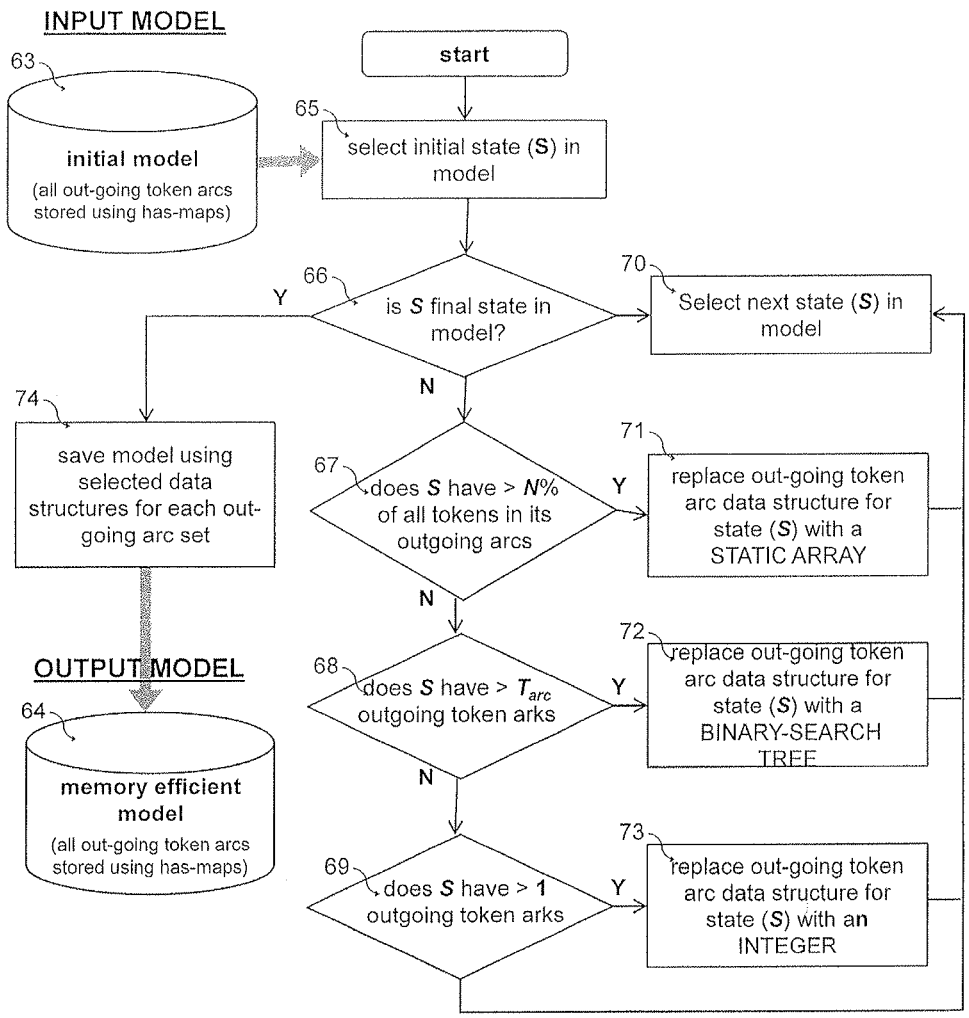
FIG. 19 shows a schematic drawing of the procedure to produce an memory efficient model by selecting the most appropriate data structure (HASH-MAP, STATIC ARRAY, BINARY SEARCH TREE, single INTEGER) in the "fast and memory efficient look-up" architecture as used in the present invention.
Figure 20:
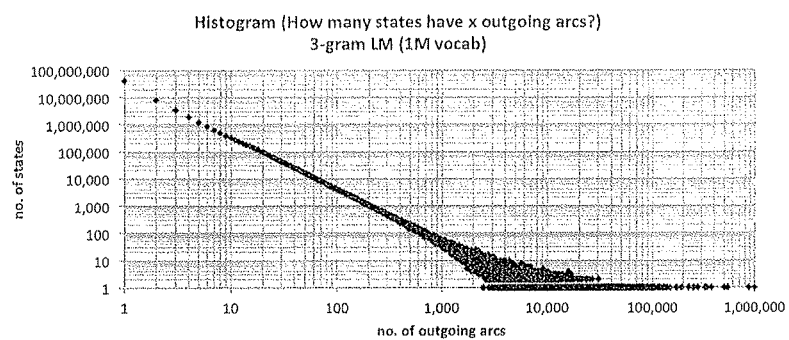
FIG. 20 shows data comparing the number of out-going arcs and the number of states, before memory optimization in the "fast and memory efficient look-up" architecture, as applied to the task of large vocabulary continuous speech recognition with a vocabulary size of 1 Million.
Figure 21:
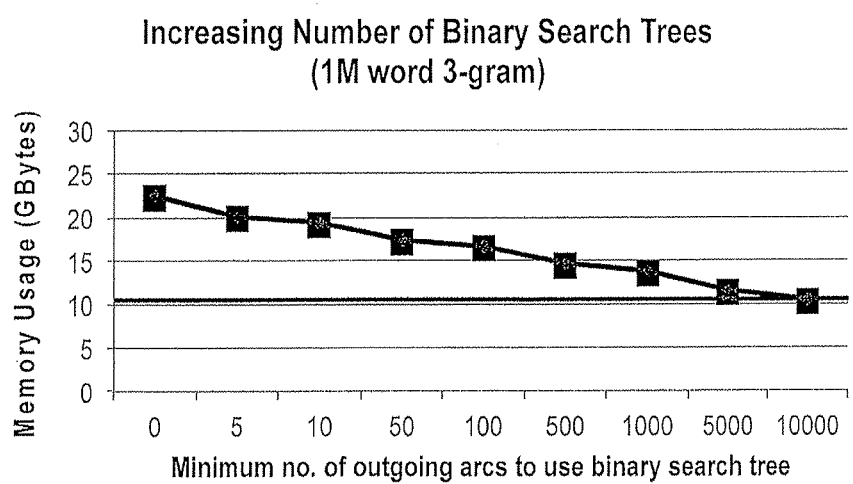
FIG. 21 shows data comparing the memory footprint to the number of out-going arcs to use a BINARY-SEARCH tree in the "fast and memory efficient look-up" architecture, as applied to the task of large vocabulary continuous speech recognition.
Figure 22:
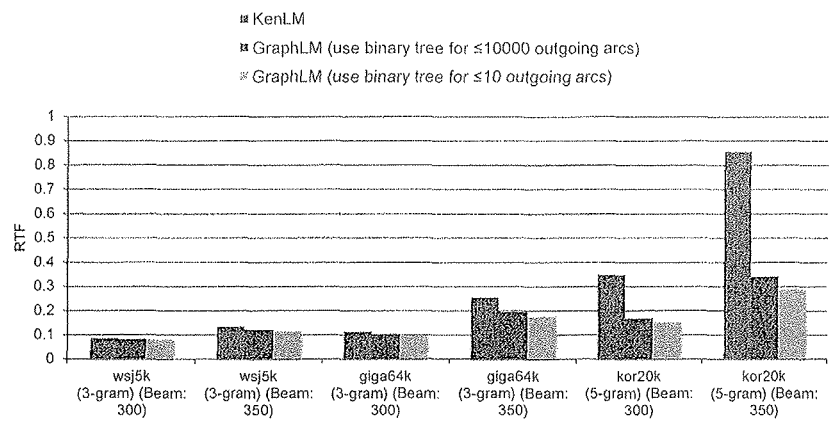
FIG. 22 shows data comparing speed (i.e. real-time-factor (RTF)) for prior approaches (namely KenLM) and the implemented "fast and memory efficient look-up" architecture, as applied to the task of large vocabulary continuous speech recognition.
Figure 23:
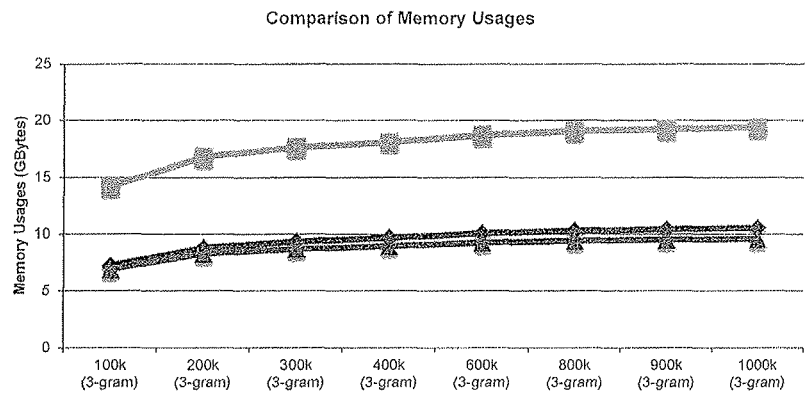
FIG. 23 shows data comparing memory footprint (GBytes) for prior approaches (namely KenLM) and the implemented "fast and memory efficient look-up" architecture, as applied to the task of large vocabulary continuous speech recognition.

The method described in FIG. 19 is used to minimize the memory footprint required to store the data. First we load an initial model (item 9), where all out-going arcs are stored using hashmaps, and select the first state (S) in the model [step]. For each state in the model we then compare the number of out-going arks Experimental Evaluation In a prototype, we evaluated using heterogeneous data structures as described above to store probabilities from a very large Language Models (1 million words, 488 Million probabilities). First, we replaced HASH-MAPS that only had a single entry with a single INTEGER. This reduced the required memory footprint by 21.4%. From 28.64 GBytes to 22.50 GBytes.

Next, we replaced HASH-MAPS that had more that 90% of the vocabulary in the out-going arcs with a STATIC ARRAY data structure that matched the size of the total vocabulary. In this case, tokens that did not occur in the out-going arc set are identified (with one-lookup) within this array. Memory usage was reduced from 22.50 to 22.47 GBytes using this approach.

Finally, we replaced HASH-MAPS that had more that $T_{arc}$ out-going arcs with a BINARY-SEARCH TREE. By altering the value of $T_{arc}$ from 2 to 10,000 (<1% of the total vocabulary size), we could reduce the memory usage to 10.5 GBytes, a 63.4% reduction in memory usage compared to the original HASH-MAP-based implementation. $T_{arc}$ can be optimized for a specific platform or data set, memory footprint vs. lookup speed. Experimental results are shown in FIGS. 20, 21, 22 and 23.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A computer-implemented statistical-inference method for graph-traversal used for speech recognition, comprising the method steps of:
   providing a computing platform comprising at least one Central Processing Unit (CPU) and at least one Graphical Processing Unit (GPU);
   initializing likelihoods;
   capturing a sample for an input signal, wherein the sample comprises a unit of speech;
   computing sample features from the sample;
   using the GPU, computing observation likelihoods for each of the sample features based on at least one of acoustic model and a language model;
   using the GPU, updating likelihoods based on observation likelihoods for the each of the sample features and likelihoods in previous time step to form a set of partial hypotheses, wherein each partial hypothesis of the set of partial hypotheses comprises a sequence of tokens from the at acoustic model or language model that potentially matches the unit of speech;
   using the CPU, computing likelihood corrections for each partial hypothesis of the set of partial hypotheses;
   using the GPU, updating likelihoods for the each partial hypothesis of the set of partial hypotheses;
   synchronizing a first back-track table on the CPU to match a second back-track table on the GPU: and
   performing back-track on the set of updated partial hypotheses and determining a most likely partial hypothesis of the set of updated partial hypotheses.

2. The method of claim 1, wherein the step of computing observation likelihoods for each of the sample features comprises:
   computing the observation likelihoods for each of the sample features using a Gaussian mixture model.

3. The method of claim 1, wherein the step of computing observation likelihoods for each of the sample features comprises:
   computing the observation likelihoods for each of the sample features using a neural network.

4. The method of claim 1, wherein the step of computing likelihood corrections for each partial hypothesis of the set of partial hypotheses comprises:
   computing likelihood corrections for each partial hypothesis of the set of partial hypotheses using an n-gram language model.

5. The method of claim 1, wherein the step of computing likelihood corrections for each partial hypothesis of the set of partial hypotheses comprises:
   computing likelihood corrections for each partial hypothesis of the set of partial hypotheses using a neural network.

6. The method of claim 1, further comprising:
   sorting each partial hypothesis of the set of partial hypotheses; and
   removing partial hypotheses that fall below a ranking threshold.

7. The method of claim 1, further comprising:
   creating a data structure to store a probability of a history as an out-going arc,
      wherein the history represents a token sequence,
      wherein the data structure used to store an out-going set of arcs changes based on a number of arcs exiting a state.

8. The method of claim 7, further comprising:
   storing the out-going set of arcs in a first database;
   creating a search model based on the out-going set of arcs;
   revising the search model based on a state of the search model; and
   saving a revised search model in a second database.

9. The method of claim 1, wherein the step of performing back-track on the set of updated partial hypotheses and determining a most likely partial hypothesis of the set of updated partial hypotheses comprises:
   merging the set of updated partial hypotheses using an atomic compare-and-swap operation.

10. A computer-implemented statistical-inference method for graph-traversal, comprising the method steps of:
   providing a parallel processor computing platform comprising a first processing unit and a second processing unit;
   initializing likelihoods;
   capturing a sample for an input signal, wherein the sample comprises a unit of speech;
   computing sample features from the sample;
   using the second processing unit computing observation likelihoods for each of the sample features based on at least one of an acoustic model and a language model;
   using the second processing unit updating likelihoods based on observation likelihoods for the each of the sample features and likelihoods in previous time step to form a set of partial hypotheses, wherein each partial hypothesis of the set of partial hypotheses comprises a sequence of tokens from the at acoustic model or language model that potentially matches the unit of speech;
   using the first processing unit computing likelihood corrections for each partial hypothesis of the set of partial hypotheses;
   using the second processing unit updating likelihoods for the each partial hypothesis of the set of partial hypotheses;
   synchronizing a first back-track table on the first processing unit to match a second backtrack table on the second processing unit; and performing back-track on the set of updated partial hypotheses and determining a most likely partial hypothesis of the set of updated partial hypotheses.

11. The method of claim 10, further comprising:
   sorting each partial hypothesis of the set of partial hypotheses; and
   removing partial hypotheses that fall below a ranking threshold.

12. The method of claim 10, further comprising:
   creating a data structure to store a probability of a history as an out-going arc,
      wherein the history represents a token sequence,
      wherein the data structure used to store an out-going set of arcs changes based on a number of arcs exiting a state.

13. The method of claim 12, further comprising:
   storing the out-going set of arcs in a first database;
   creating a search model based on the out-going set of arcs;
   revising the search model based on a state of the search model; and
   saving a revised search model in a second database.

14. The method of claim 10, wherein the step of performing back-track on the set of updated partial hypotheses and determining a most likely partial hypothesis of the set of updated partial hypotheses comprises:
   merging the set of updated partial hypotheses using an atomic compare-and-swap operation.

* * * * *